(12) United States Patent
Aoki

(10) Patent No.: US 11,736,021 B2
(45) Date of Patent: Aug. 22, 2023

(54) POWER CONVERSION DEVICE WITH NOISE REDUCTION

(71) Applicant: Mitsubishi Electric Corporation, Tokyo (JP)

(72) Inventor: Wataru Aoki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/584,800

(22) Filed: Jan. 26, 2022

(65) Prior Publication Data

US 2022/0399817 A1    Dec. 15, 2022

(30) Foreign Application Priority Data

Jun. 9, 2021   (JP) ................................ 2021-096323

(51) Int. Cl.
| | | |
|---|---|---|
| *H02M 3/335* | (2006.01) | |
| *H02M 7/00* | (2006.01) | |
| *H02M 1/14* | (2006.01) | |
| *H02M 1/32* | (2007.01) | |

(52) U.S. Cl.
CPC .......... *H02M 3/335* (2013.01); *H02M 1/143* (2013.01); *H02M 1/32* (2013.01); *H02M 3/33569* (2013.01); *H02M 7/003* (2013.01)

(58) Field of Classification Search
CPC ........ H02M 3/335; H02M 1/143; H02M 1/32; H02M 3/33569; H02M 7/003
See application file for complete search history.

(56) References Cited

U.S. PATENT DOCUMENTS

| | | | | |
|---|---|---|---|---|
| 4,656,412 A | * | 4/1987 | McLyman ............... | H02J 50/12 363/75 |
| 5,373,418 A | * | 12/1994 | Hayasi .................... | H01L 24/01 257/E23.084 |
| 5,835,350 A | * | 11/1998 | Stevens ................. | H02M 3/003 257/796 |
| 6,473,304 B1 | * | 10/2002 | Stevens .................. | H02M 3/28 361/752 |

(Continued)

FOREIGN PATENT DOCUMENTS

JP       2011-050160 A       3/2011

*Primary Examiner* — Yusef A Ahmed
(74) *Attorney, Agent, or Firm* — Sughrue Mion, PLLC; Richard C. Turner

(57) ABSTRACT

This power conversion device includes: a base; a control substrate; a first rectification element; a second rectification element; a smoothing reactor; an output filter circuit portion; a first main circuit wire; a second main circuit wire; and smoothing capacitors. As seen in a direction perpendicular to a surface of the control substrate, at least some of the smoothing capacitors and a target region obtained by combining a region in which the first rectification element is disposed, a region in which the second rectification element is disposed, and a region between the first rectification element and the second rectification element, overlap with each other, and a low-potential-side connection point of each smoothing capacitor connected to the second main circuit wire, is disposed so as to overlap with the control substrate and a region obtained by extending the target region in a specific direction and a direction opposite to the specific direction.

11 Claims, 9 Drawing Sheets

(56) References Cited

U.S. PATENT DOCUMENTS

| | | | | |
|---|---|---|---|---|
| 6,650,559 | B1* | 11/2003 | Okamoto | H01L 25/162 |
| | | | | 363/141 |
| 6,970,367 | B2* | 11/2005 | Takeshima | H05K 1/165 |
| | | | | 363/97 |
| 8,456,867 | B1* | 6/2013 | Karlsson | H02M 1/36 |
| | | | | 323/901 |
| 9,083,255 | B2* | 7/2015 | Duan | H02M 3/33592 |
| 9,124,190 | B2* | 9/2015 | Karlsson | H02M 3/33592 |
| 9,252,672 | B2* | 2/2016 | Wu | H02M 3/33507 |
| 9,776,514 | B2* | 10/2017 | Sobu | H02M 3/04 |
| 10,554,138 | B2* | 2/2020 | Tschirhart | H02M 1/32 |
| 2001/0040812 | A1* | 11/2001 | Jitaru | H02J 1/102 |
| | | | | 363/21.06 |
| 2003/0039133 | A1* | 2/2003 | Yamamoto | H02M 7/06 |
| | | | | 363/100 |
| 2003/0058660 | A1* | 3/2003 | Biebach | H01F 27/324 |
| | | | | 363/21.01 |
| 2005/0083665 | A1* | 4/2005 | Nakashima | H05K 1/181 |
| | | | | 361/767 |
| 2006/0092599 | A1* | 5/2006 | Yamamura | H05K 1/0263 |
| | | | | 361/611 |
| 2007/0047266 | A1* | 3/2007 | Nakahori | H02M 3/28 |
| | | | | 363/17 |
| 2009/0109710 | A1* | 4/2009 | Nakahori | H01F 27/40 |
| | | | | 363/17 |
| 2010/0232181 | A1* | 9/2010 | Nakahori | H01F 27/2804 |
| | | | | 336/221 |
| 2013/0021749 | A1* | 1/2013 | Nakajima | H05K 7/20927 |
| | | | | 361/689 |
| 2013/0021771 | A1* | 1/2013 | Goto | H05K 9/0037 |
| | | | | 361/816 |
| 2013/0100634 | A1* | 4/2013 | Okubo | H01F 27/363 |
| | | | | 361/816 |
| 2013/0100707 | A1* | 4/2013 | Hatakeyama | H02M 3/3376 |
| | | | | 363/17 |
| 2014/0240946 | A1* | 8/2014 | Fukumasu | B60L 58/20 |
| | | | | 361/811 |
| 2014/0313788 | A1* | 10/2014 | Okubo | H02M 3/28 |
| | | | | 363/21.01 |
| 2014/0321065 | A1* | 10/2014 | Nishimura | H02M 3/28 |
| | | | | 361/722 |
| 2015/0194898 | A1* | 7/2015 | Shinohara | H05K 9/0037 |
| | | | | 363/17 |
| 2016/0248333 | A1* | 8/2016 | Nakazawa | H05K 7/2039 |
| 2017/0025963 | A1* | 1/2017 | Otake | H02M 3/285 |
| 2017/0316863 | A1* | 11/2017 | Francis | H01F 27/28 |
| 2018/0069485 | A1* | 3/2018 | Hsiao | H02M 3/285 |
| 2019/0110355 | A1* | 4/2019 | Sato | H05K 1/181 |
| 2021/0281188 | A1* | 9/2021 | Yabuuchi | H02M 1/14 |
| 2022/0069727 | A1* | 3/2022 | Inoue | H02M 7/003 |

* cited by examiner

POWER CONVERSION DEVICE WITH NOISE REDUCTION

BACKGROUND OF THE INVENTION

1. Field of the Invention

The present disclosure relates to a power conversion device.

2. Description of the Background Art

Electric vehicles (EVs) and hybrid vehicles such as hybrid electric vehicles (HEVs) and plug-in hybrid electric vehicles (PHEVs) have been developed as environmentally friendly vehicles. Motorized vehicles such as electric vehicles and hybrid vehicles are mounted with power conversion devices that include a DC-DC converter for stepping down a voltage of a high-voltage battery to convert the voltage into a voltage for an auxiliary device battery. In general, such a DC-DC converter is composed of: an inverter circuit for converting a high DC voltage into a high AC voltage; a transformer for converting the high AC voltage into a low AC voltage; a rectification element for rectifying the low AC voltage to convert the AC voltage into a DC pulse voltage; a smoothing reactor and a smoothing capacitor for smoothing the DC pulse voltage; a filter circuit for reducing a noise outputted from the DC-DC converter, to a value not larger than a predetermined value; a control circuit for controlling the inverter circuit; and a housing accommodating these components and including a water path for cooling heat-generating components such as the transformer and the rectification element.

In recent years, noises generated from DC-DC converters tend to increase owing to increases in the frequencies of inverter circuits thereof and increases in the densities of the entire devices. Thus, measures against noise sources are needed, and a configuration of a DC-DC converter in which such measures are taken has been disclosed (see, for example, Patent Document 1). In the disclosed configuration, a rectification element and a smoothing capacitor are mounted on the surface of a substrate thermally connected to a housing, and a smoothing reactor is disposed directly above the rectification element and the smoothing capacitor. Further, a secondary-side winding terminal of a transformer is disposed in the immediate vicinity of the smoothing reactor and the rectification element, and a terminal connecting the smoothing reactor and the smoothing capacitor is disposed in the immediate vicinity of, and connected to, the smoothing reactor and the smoothing capacitor. By this configuration, a loop path in which secondary-side current intermittently flows is shortened, and at the same time, a parasitic inductance of the path is made low. Therefore, the level of noise can be reduced.

Patent Document 1: Japanese Laid-Open Patent Publication No. 2011-50160

In the above Patent Document 1, since the parasitic inductance of the loop path is made low, the level of noise can be reduced. However, the smoothing reactor is supported through only the connection between the transformer and the terminal, and the smoothing reactor is disposed in the air in a state of floating above the substrate. Therefore, there is a case where the smoothing reactor is greatly shaken owing to vibrations during running of the vehicle, and a core and a copper wire of the smoothing reactor are damaged. Thus, a problem arises in that a measure against vibrations needs to be taken for the smoothing reactor. Addition of a support structure for the smoothing reactor, filling with a cushioning member around the smoothing reactor, and the like are conceivable as measures against vibrations. However, since a high current of 100 to 200 A flows through the smoothing reactor of the DC-DC converter and the sizes and the weights of the core and the copper wire tend to increase, the measures against vibrations of the smoothing reactor are costly.

In addition, in the above Patent Document 1, a high current of 100 to 200 A flows also to the rectification element mounted on the substrate, and thus a high-cost substrate such as a thick-copper pattern substrate needs to be used for the DC-DC converter. Since the smoothing capacitor is also mounted on the thick-copper pattern substrate, a problem arises in that the size of the high-cost substrate increases correspondingly to the area of the mounted smoothing capacitor, and thus cost for the power conversion device further increases.

SUMMARY OF THE INVENTION

Considering this, an object of the present disclosure is to obtain a power conversion device including a DC-DC converter having a reduced level of noise while suppressing increases in costs regarding measures against vibrations and substrates.

A power conversion device according to the present disclosure includes: a base; a transformer disposed on a first surface of the base and having a primary winding and a secondary winding; an inverter portion having a semiconductor switching element and configured to supply power to the primary winding; a control substrate disposed apart from the first surface of the base and having a control circuit configured to control the inverter portion; a first rectification element having a first terminal which is connected to one end portion of the secondary winding and which is provided adjacent to the transformer, the first rectification element further having a second terminal, the first rectification element being disposed on the first surface side of the base so as to be located on a specific direction side relative to the transformer; a second rectification element having a third terminal which is connected to another end portion of the secondary winding and which is provided adjacent to the transformer, the second rectification element further having a fourth terminal, the second rectification element being disposed, side by side with the first rectification element, on the first surface side of the base so as to be located on the specific direction side relative to the transformer; a smoothing reactor disposed on the first surface of the base and having one end portion connected to a center tap which is provided between the one end portion and the other end portion of the secondary winding; an output filter circuit portion connected between another end portion of the smoothing reactor and a high-potential side of an external load; a first main circuit wire making connection between the other end portion of the smoothing reactor and the output filter circuit portion; a second main circuit wire making connection between a low-potential side of the external load and each of the second terminal of the first rectification element and the fourth terminal of the second rectification element; and smoothing capacitors each having a high-potential-side terminal connected to the first main circuit wire and each having a low-potential-side terminal connected to the second main circuit wire, the smoothing capacitors being mounted on the control substrate, wherein, as seen in a direction perpendicular to a surface of the control substrate, at least some of the smoothing capacitors and a target region obtained by combining a region in which the first rectification element is disposed, a region in which the second rectification element is disposed, and a region between the first rectification element and the second rectification element, overlap with each other, and, as seen in the direction perpendicular to the surface of the control substrate, a low-potential-side connection point of each smoothing capacitor connected to the second main circuit wire, is disposed so as to overlap with the control substrate and a region obtained by extending the target region in the specific direction and a direction opposite to the specific direction.

The power conversion device according to the present disclosure includes: a base; a transformer disposed on a first surface of the base; an inverter portion; a control substrate disposed apart from the first surface of the base; a first rectification element disposed on the first surface side of the base so as to be located on a specific direction side relative to the transformer; a second rectification element disposed, side by side with the first rectification element, on the first surface side of the base so as to be located on the specific direction side relative to the transformer; a smoothing reactor disposed on the first surface of the base; an output filter circuit portion; a first main circuit wire making connection between the smoothing reactor and the output filter circuit portion; a second main circuit wire making connection between a low-potential side of an external load and each of a second terminal of the first rectification element and a fourth terminal of the second rectification element; and smoothing capacitors each having a high-potential-side terminal connected to the first main circuit wire and each having a low-potential-side terminal connected to the second main circuit wire, the smoothing capacitors being mounted on the control substrate, wherein, as seen in a direction perpendicular to a surface of the control substrate, at least some of the smoothing capacitors and a target region obtained by combining a region in which the first rectification element is disposed, a region in which the second rectification element is disposed, and a region between the first rectification element and the second rectification element, overlap with each other, and, as seen in the direction perpendicular to the surface of the control substrate, a low-potential-side connection point of each smoothing capacitor connected to the second main circuit wire, is disposed so as to overlap with the control substrate and a region obtained by extending the target region in the specific direction and a direction opposite to the specific direction. Thus, the smoothing capacitor, and the connection point between the low-potential-side terminal of the smoothing capacitor and the second main circuit wire, are disposed in the immediate vicinity of the first rectification element and the second rectification element. This disposition leads to reduction in the impedance of a path from the connection point between the high-potential-side terminal of the smoothing capacitor and the first main circuit wire to each of the first rectification element and the second rectification element. Consequently, the level of noise generated in the path can be reduced.

Further, since the transformer and the smoothing reactor are disposed on the first surface of the base, it is easy to take measures against vibrations of the transformer and the smoothing reactor which are heavy objects. Therefore, increase in cost for the power conversion device regarding measures against vibrations can be suppressed. Further, the smoothing capacitor is disposed on the control substrate at a height different from the heights of wires through which high current flows, such as the first main circuit wire and the second main circuit wire. Thus, it is unnecessary to use any high-cost thick-copper pattern substrate as the control substrate. Therefore, increase in cost for the power conversion device regarding substrates can be suppressed.

DETAILED DESCRIPTION OF THE PREFERRED EMBODIMENTS OF THE INVENTION

Figure 1:
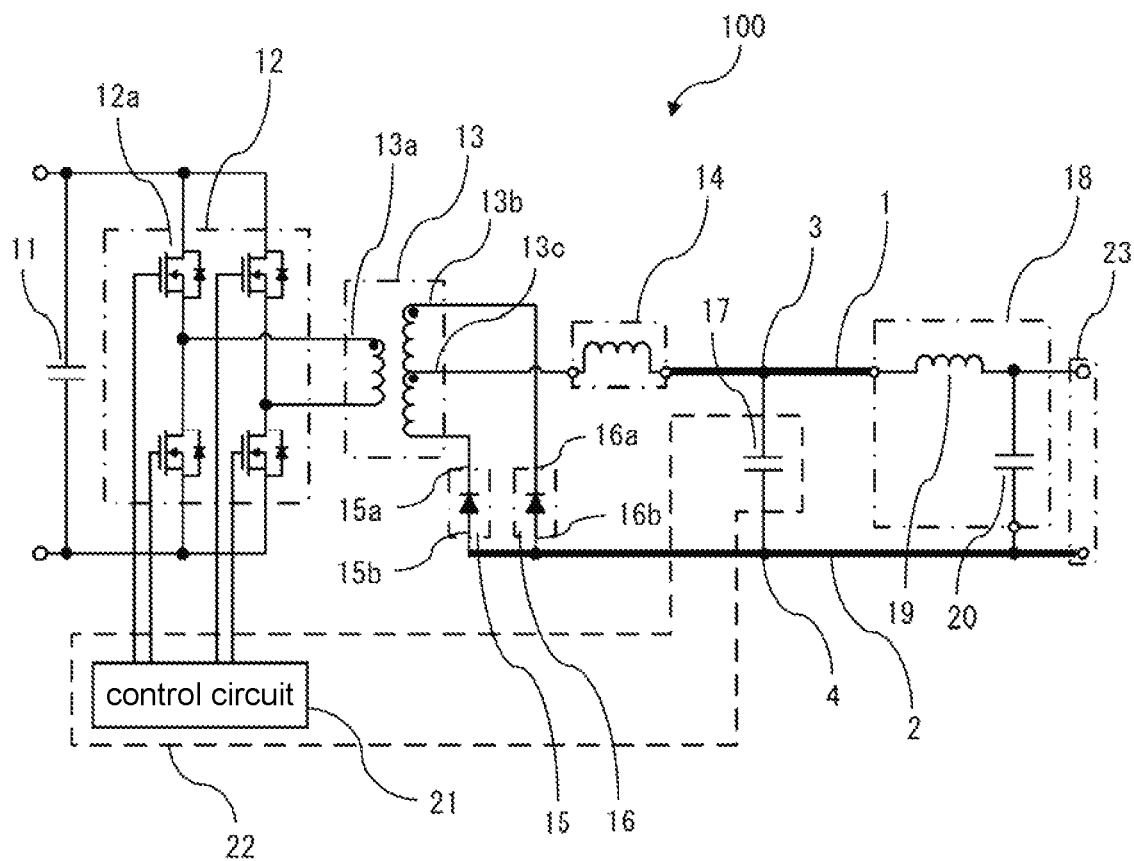
FIG. 1 illustrates a circuit configuration of a power conversion device according to a first embodiment.

Hereinafter, power conversion devices according to embodiments of the present disclosure will be described with reference to the drawings. Description will be given while the same or corresponding members and portions in the drawings will be denoted by the same reference characters.

First Embodiment

Figure 2:
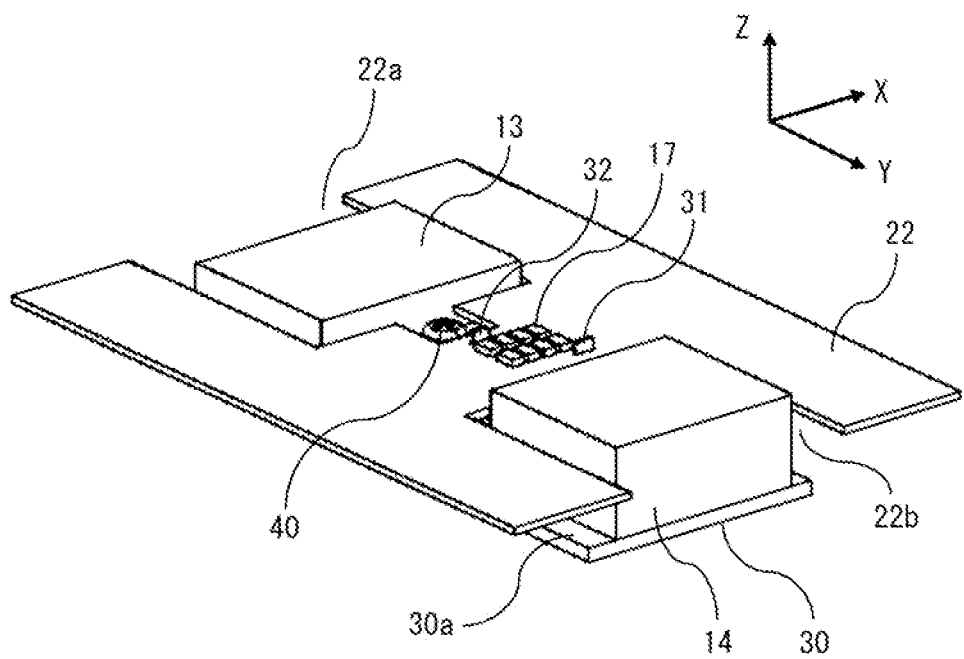
FIG. 2 is a perspective view showing a major part of the power conversion device according to the first embodiment.
Figure 3:
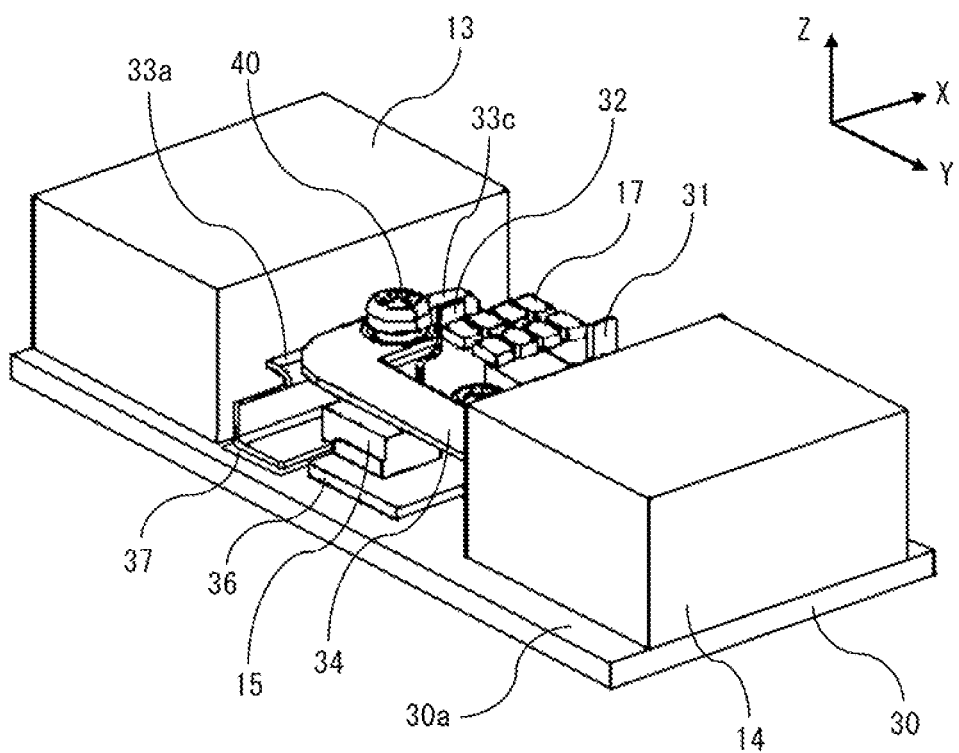
FIG. 3 is a perspective view showing the major part of the power conversion device according to the first embodiment.
Figure 4:
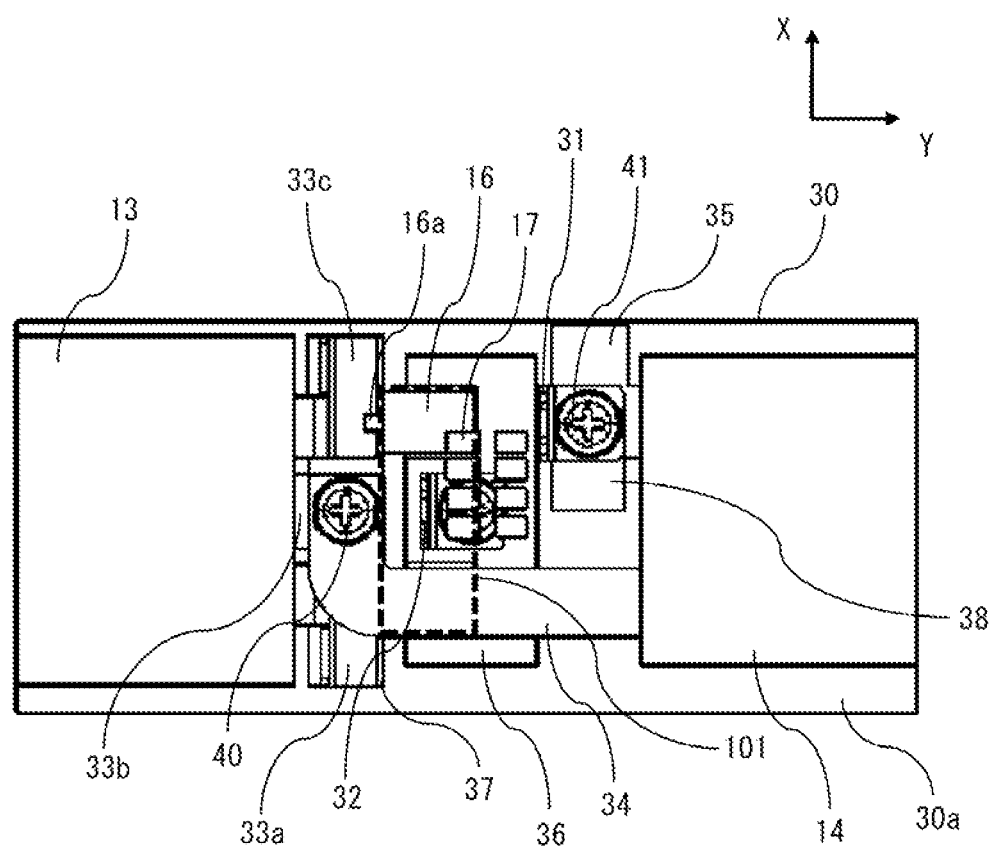
FIG. 4 is a plan view showing the major part of the power conversion device according to the first embodiment.
Figure 5:
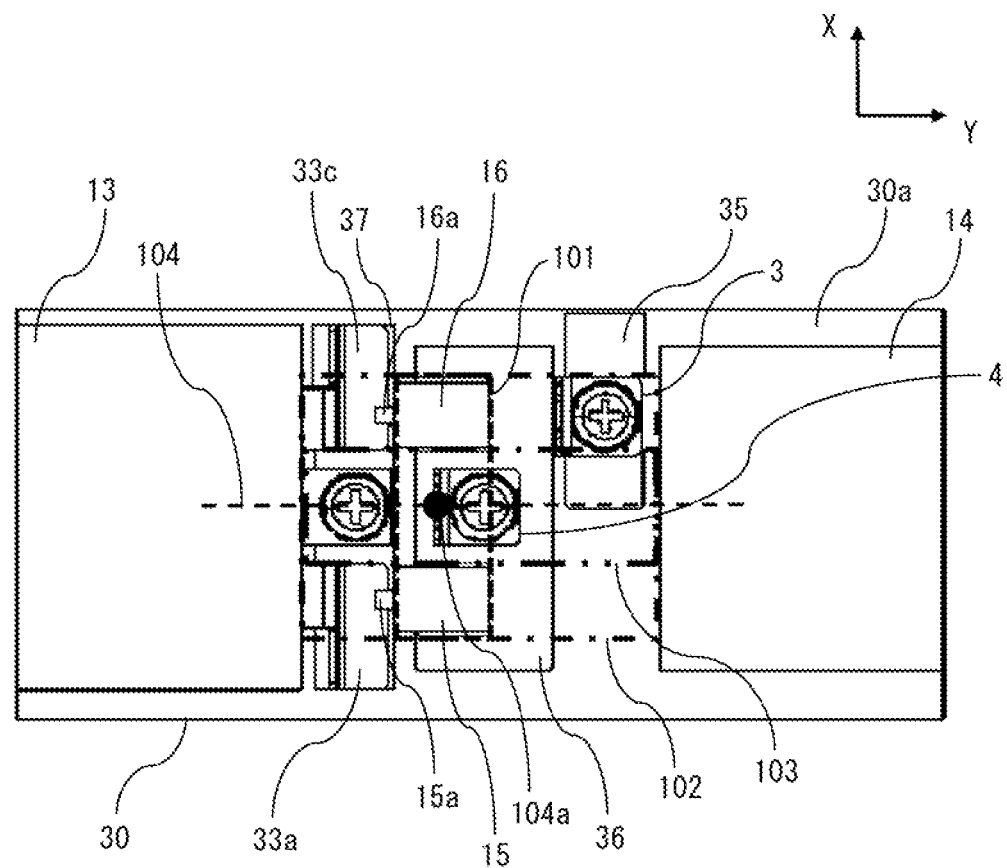
FIG. 5 is a plan view showing the major part of the power conversion device according to the first embodiment.
Figure 6:
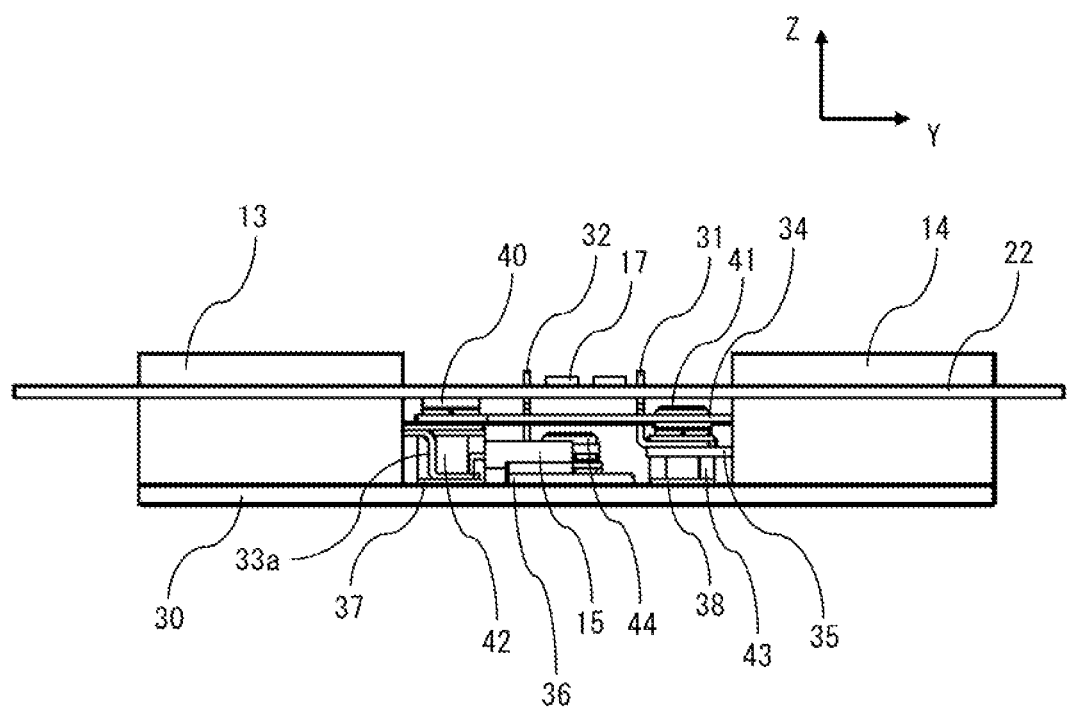
FIG. 6 is a side view showing the major part of the power conversion device according to the first embodiment.
Figure 7:
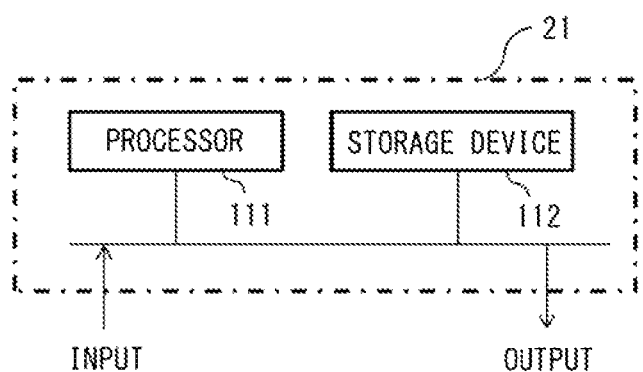
FIG. 7 is a configuration diagram showing a hardware example of a control circuit of the power conversion device.

FIG. 1 illustrates a circuit configuration of a power conversion device 100 according to a first embodiment. FIG. 2 is a perspective view showing a major part of the power conversion device 100, illustrating a configuration of a portion thereof extending from a transformer 13 toward an output filter circuit portion 18 in FIG. 1. FIG. 3 is a perspective view showing the major part of the power conversion device 100, excluding a control substrate 22 from FIG. 2. FIG. 4 is a plan view showing the major part of the power conversion device 100. FIG. 4 illustrates the configuration of the portion extending from the transformer 13 toward the output filter circuit portion 18 in FIG. 1, excluding the control substrate 22. FIG. 5 is a plan view showing the major part of the power conversion device 100, excluding smoothing capacitors 17 and a busbar 34 from FIG. 4. FIG. 6 is a side view showing the major part of the power conversion device 100. FIG. 7 is a configuration diagram showing a hardware example of a control circuit 21 of the power conversion device 100. The power conversion device 100 includes a DC-DC converter for stepping down a voltage of a high-voltage battery to convert the voltage into a low voltage. The power conversion device 100 is mounted in, for example, a motorized vehicle such as an electric vehicle or a hybrid vehicle.

<Power Conversion Device 100>

A main circuit configuration of the power conversion device 100 will be described. As shown in FIG. 1, the power conversion device 100 includes an inverter portion 12, the transformer 13, a smoothing reactor 14, a first rectification element 15, a second rectification element 16, the smoothing capacitors 17, the output filter circuit portion 18, and the control circuit 21. In FIG. 1, the left side is an input side, and the right side is an output side. The power conversion device 100 includes an output end 23 on the output side. The high-voltage battery is connected to the input side, and a load such as a low-voltage battery is connected to the output side. The power conversion device 100 includes, on the input side, an input capacitor 11 connected to the inverter portion 12 and configured to smooth an input voltage of the inverter portion 12.

The inverter portion 12 converts the smoothed high DC voltage into a high AC voltage. The inverter portion 12 has a plurality of semiconductor switching elements 12a and supplies power to a primary winding 13a of the transformer 13. The control circuit 21 is connected to each semiconductor switching element 12a and controls an operation of the inverter portion 12. The control circuit 21 is mounted on the control substrate 22. The transformer 13 converts the high AC voltage into a low AC voltage. The transformer 13 has the primary winding 13a and a secondary winding 13b. A center tap 13c is provided between one end portion and another end portion of the secondary winding 13b.

The first rectification element 15 and the second rectification element 16 rectify the low AC voltage outputted from the secondary winding 13b to convert the low AC voltage into a DC pulse voltage. The first rectification element 15 has: a first terminal 15a connected to the one end portion of the secondary winding 13b; and a second terminal 15b. The second rectification element 16 has: a third terminal 16a connected to the other end portion of the secondary winding 13b; and a fourth terminal 16b. The smoothing reactor 14 and each smoothing capacitor 17 smooth the DC pulse voltage. The smoothing reactor 14 has one end portion connected to the center tap 13c. The output filter circuit portion 18 reduces a noise outputted from the power conversion device 100, to a value not larger than a predetermined value. The output filter circuit portion 18 is connected between another end portion of the smoothing reactor 14 and a high-potential side of an external load. The output filter circuit portion 18 is connected at a high-potential side of the output end 23 to the high-potential side of the external load. The output filter circuit portion 18 includes a filter circuit reactor 19 and a filter circuit capacitor 20.

A first main circuit wire 1 makes connection between the other end portion of the smoothing reactor 14 and the output filter circuit portion 18. A second main circuit wire 2 makes connection between a low-potential side of the external load and each of the second terminal 15b of the first rectification element 15 and the fourth terminal 16b of the second rectification element 16. The second main circuit wire 2 is connected at a low-potential side of the output end 23 to the low-potential side of the external load. The smoothing capacitor 17 is mounted on the control substrate 22. A high-potential-side terminal of the smoothing capacitor 17 is connected at a first connection point 3 to the first main circuit wire 1, and a low-potential-side terminal of the smoothing capacitor 17 is connected at a second connection point 4 to the second main circuit wire 2.

As the semiconductor switching element 12a of the inverter portion 12, a self-turn-off semiconductor switching element such as a metal oxide semiconductor field effect transistor (MOSFET) is used. The semiconductor switching element 12a is not limited to an MOSFET and may be another semiconductor switching element. The semiconductor switching element 12a is formed on a semiconductor substrate made from a semiconductor material such as silicon (Si), silicon carbide (SiC), or gallium nitride (GaN).

The control circuit 21, a hardware example of which is shown in FIG. 7, is composed of a processor 111 which is a microcomputer for executing a calculation process and a storage device 112, for example. Although not shown, the storage device 112 is composed of: a nonvolatile auxiliary storage device such as a read only memory (ROM) for storing data such as program data and fixed-value data; and a volatile storage device such as a random access memory (RAM) in which stored data is updated and sequentially rewritten. The processor 111 executes a program inputted from the storage device 112. In this case, the program is inputted from the auxiliary storage device via the volatile storage device to the processor 111. Further, the processor 111 may output data such as a calculation result to the volatile storage device of the storage device 112 or may save the data via the volatile storage device to the auxiliary storage device.

For convenience, each of the first rectification element 15 and the second rectification element 16 shown in the circuit configuration in FIG. 1 is indicated as one diode, but in actuality, may be implemented by a plurality of diodes, i.e., two or more diodes provided in parallel. Alternatively, each of the first rectification element 15 and the second rectification element 16 may be configured with a self-turn-off semiconductor switching element such as an MOSFET.

<Component Arrangement in Power Conversion Device 100>

Component arrangement in the portion extending from the transformer 13 toward the output filter circuit portion 18 in FIG. 1 will be described as the major part of the power conversion device 100. As shown in FIG. 2, components in the portion extending from the transformer 13 toward the output filter circuit portion 18 are disposed on a first surface side of a base 30 which is formed in a plate shape and which is made of metal. The first surface of the base 30 is a component-arranged surface 30a. The shape of the base 30 is not limited to a plate shape and may be, for example, a block shape. Further, the base 30 may be a member that functions as a part of a cooler or a housing. In the present embodiment, the base 30 is a part of a housing, of the power conversion device 100, which accommodates the components disposed on the base 30 and other components. In this case, the base 30 made of metal functions as a low-potential-side terminal of the output end 23 shown in FIG. 1. The material of the base 30 is not limited to metal, and the base 30 may be configured to separately include a busbar that functions as a wire on the low-potential side and the like. In the case where the base 30 is made of metal, the base 30 functions as a housing and functions also as a low-potential-side terminal. Thus, no other low-potential-side terminals are necessary, whereby productivity for the power conversion device 100 can be improved. Further, increase in cost for the power conversion device 100 can be suppressed.

As shown in FIG. 3, the transformer 13 and the smoothing reactor 14 are disposed on the component-arranged surface 30a of the base 30. Each of the transformer 13 and the smoothing reactor 14 has a winding portion (not shown). The transformer 13 and the smoothing reactor 14 are, for example, such that: the winding portions thereof are accommodated in an insulative case made of resin; and the transformer 13 and the smoothing reactor 14 are fixed to the base 30 together with the case. The transformer 13 and the smoothing reactor 14 are fixed to the base 30 with, for example, a plurality of screws. Thus, the fixation with the screws serves as a measure against vibrations, whereby no other measures against vibrations such as a support structure have to be added. As shown in FIG. 4, the transformer 13 has secondary-side winding terminals 33a, 33b, and 33c on a Y-axis direction side. The Y-axis direction side is defined as a specific direction side relative to the transformer 13. The secondary-side winding terminal 33a is a terminal at the one end portion of the secondary winding 13b, the secondary-side winding terminal 33c is a terminal at the other end portion of the secondary winding 13b, and the secondary-side winding terminal 33b is a terminal at the center tap 13c of the secondary winding 13b. Since the transformer 13 and the smoothing reactor 14 are disposed on the component-arranged surface 30a of the base 30 in this manner, it is easy to take measures against vibrations of the transformer 13 and the smoothing reactor 14 which are heavy objects. Therefore, increase in cost for the power conversion device 100 regarding measures against vibrations can be suppressed.

The secondary-side winding terminal 33b is connected via the busbar 34 to the one end portion of the smoothing reactor 14. As shown in FIG. 6, the secondary-side winding terminal 33b and the busbar 34 are electrically and mechanically connected to each other by using, for example, a screw 40 and a nut 42. An insulation sheet 37 is disposed between the nut 42 and the base 30. The insulation sheet 37 functions as a part of a support for the secondary-side winding terminal 33b and the busbar 34, and the base 30 and the busbar 34 are thermally connected to each other via the insulation sheet 37. By this configuration, a portion of the center tap 13c that is connected to the smoothing reactor 14 is thermally connected to the base 30, and thus heat generated from each of the transformer 13 and the smoothing reactor 14 can be efficiently dissipated via the base 30. A busbar 35 is provided to the other end portion of the smoothing reactor 14, and the busbar 35 is connected to the output filter circuit portion 18 (not shown in FIG. 4) disposed upward of FIG. 4. The busbar 35 is a component corresponding to the first main circuit wire 1 in FIG. 1. Each of the busbars 34 and 35 is made of a metal having electrical conductivity as well as excellent thermal conductivity, such as copper or aluminum.

In the present embodiment, the smoothing reactor 14 is disposed on the specific direction side relative to the transformer 13, and the first rectification element 15, the second rectification element 16, the busbar 35, a busbar 36, and the smoothing capacitor 17 are disposed between the smoothing reactor 14 and the transformer 13. By this configuration, the component-arranged surface 30a of the base 30 can be formed to be small as shown in FIG. 4, whereby the size of the power conversion device 100 can be reduced.

As shown in FIG. 2, a part of the control substrate 22 and the smoothing capacitor 17 mounted on the control substrate 22 are disposed between the transformer 13 and the smoothing reactor 14. The control substrate 22 is disposed apart from the component-arranged surface 30a of the base. As shown in FIG. 6, the control substrate 22 is disposed at a location that is farther from the base 30 than surfaces of the first rectification element 15 and the second rectification element 16 on an opposite side to surfaces thereof on the base 30 side are, and that is closer to the base 30 than one or both of surfaces of the transformer 13 and the smoothing reactor 14 on an opposite side to surfaces thereof on the base 30 side are. In the present embodiment, the control substrate 22 is disposed at a location that is closer to the base 30 than both of the surfaces of the transformer 13 and the smoothing reactor 14 on the opposite side to the surfaces thereof on the base 30 side are. By this configuration, the control substrate 22, and terminals 31 and 32 connected to the control substrate 22 on which the smoothing capacitor 17 is mounted can be disposed close to each other, whereby the lengths in the Z-axis direction of the terminals 31 and 32 connected to the control substrate 22 can be shortened. The details of the terminals 31 and 32 connected to the control substrate 22 will be described later.

Further, one or two notches are provided in an outer periphery portion of the control substrate 22, and one or both of the transformer 13 and the smoothing reactor 14 are respectively disposed within the one or two notches. In the present embodiment, as shown in FIG. 2, the control substrate 22 has two notches 22a and 22b, the transformer 13 is disposed within the notch 22a, and the smoothing reactor 14 is disposed within the notch 22b. By this configuration, the control substrate 22 can be disposed around the base 30 in a focused manner, whereby the size of the power conversion device 100 can be reduced.

The first terminal 15a of the first rectification element 15 is provided adjacent to the transformer 13. The first rectification element 15 is disposed on the component-arranged surface 30a side of the base 30 so as to be located on the specific direction side relative to the transformer 13. The third terminal 16a of the second rectification element 16 is provided adjacent to the transformer 13. The second rectification element 16 is disposed, side by side with the first rectification element 15, on the component-arranged surface 30a side of the base 30 so as to be located on the specific direction side relative to the transformer 13. As shown in FIG. 5, a cathode terminal which is the first terminal 15a of the first rectification element 15 is connected to the secondary-side winding terminal 33a of the transformer 13, and a cathode terminal which is the third terminal 16a of the second rectification element 16 is connected to the secondary-side winding terminal 33c of the transformer 13. The insulation sheet 37 is disposed between the base 30 and the secondary-side winding terminals 33a and 33c. The base 30 and the secondary-side winding terminals 33a and 33c are thermally connected to each other via the insulation sheet 37.

A busbar 36 connecting an anode terminal which is the second terminal 15b of the first rectification element 15 and an anode terminal which is the fourth terminal 16b of the second rectification element 16, is provided on the component-arranged surface 30a. The anode terminals are provided on the busbar 36 side and connected to the busbar 36, and thus cannot be seen in FIG. 5. The busbar 36 is connected to the low-potential side of the external load. The busbar 36 is a component corresponding to the second main circuit wire 2 in FIG. 1. It is noted that, since the busbar 36 and the base 30 are at the same potential, the busbar 36 may be connected to the low-potential side of the external load via the base 30 instead of being directly connected to the low-potential side. The busbar 36 is made of a metal having electrical conductivity as well as excellent thermal conductivity, such as copper or aluminum.

The terminal 31 is connected to the busbar 35, and the control substrate 22 and the busbar 35 are connected to each other by the terminal 31. The location at which the busbar 35 and the terminal 31 are connected to each other, is a portion corresponding to the first connection point 3 in FIG. 1. As shown in FIG. 6, the busbar 35 and the terminal 31 are electrically and mechanically connected to each other by using, for example, a screw 41 and a nut 43. An insulation sheet 38 is disposed between the nut 43 and the base 30. The insulation sheet 38 functions as a part of a support for the terminal 31 and the busbar 35, and the base 30 and the busbar 35 are thermally connected to each other via the insulation sheet 38. By this configuration, heat generated from the smoothing reactor 14 can be efficiently dissipated via the base 30.

The terminal 32 is connected to the busbar 36, and the control substrate 22 and the busbar 36 are connected to each other by the terminal 32. The location at which the busbar 36 and the terminal 32 are connected to each other, is a portion corresponding to the second connection point 4 in FIG. 1. The busbar 36 and the terminal 32 are fixed to the base 30 by using, for example, a screw 44. By this fixation, the busbar 36 and the terminal 32 are electrically and mechanically connected to each other. Further, the busbar 36 and the terminal 32 are thermally connected to the base 30. By this configuration, heat generated from each of the first rectification element 15 and the second rectification element 16 can be efficiently dissipated via the base 30.

As described above, the control substrate 22 is disposed at a location that is farther from the base 30 than the first rectification element 15 and the second rectification element 16 are, and that is closer to the base 30 than the surfaces of the transformer 13 and the smoothing reactor 14 on the opposite side to the surfaces thereof on the base 30 side are. Thus, the lengths in the Z-axis direction of the terminals 31 and 32 connected to the control substrate 22 can be shortened. Therefore, the length of the path from the first connection point 3 to each of the first rectification element 15 and the second rectification element 16 is shortened, and the effect of noise reduction can be more improved.

The high-potential-side terminal (not shown) of the smoothing capacitor 17 and the terminal 31 are connected to each other by using a wire pattern provided on the control substrate 22. The low-potential-side terminal (not shown) of the smoothing capacitor 17 and the terminal 32 are connected to each other by using a wire pattern provided on the control substrate 22. The smoothing capacitor 17 is, for example, a chip-laminated ceramic capacitor for surface mounting. If a capacitor for surface mounting is used as the smoothing capacitor 17, the mounting area and the mounting height of the smoothing capacitor 17 can be reduced. Since the mounting area and the mounting height of the smoothing capacitor 17 can be reduced, the size of the power conversion device 100 can be reduced. In the present embodiment, as shown in FIG. 4, eight smoothing capacitors 17 are provided and connected to have a four-in-parallel and two-in-series configuration. Although the configuration in which the groups each composed of the two or more smoothing capacitors connected in parallel are connected in series is employed in this manner as a measure for protection from short circuiting against cases where any of the smoothing capacitors 17 is short-circuited and failed, the number of the smoothing capacitors 17 and the connection configuration thereof are not limited thereto.

Each smoothing capacitor 17 is disposed on the control substrate 22 at a height different from the heights of wires through which high current flows, such as the busbar 35 and the busbar 36. Thus, unlike Patent Document 1, it is unnecessary to use any high-cost thick-copper pattern substrate as the control substrate 22. Therefore, increase in cost for the power conversion device 100 regarding substrates can be suppressed. Further, only the smoothing capacitor 17 which has a small size and which is light-weight is disposed directly above the first rectification element 15 and the second rectification element 16. Since the smoothing capacitor 17 is mounted on the control substrate 22 which is light-weight and the control substrate 22 can be easily fixed to the base 30 via a supporting column (not shown) or the like, it is easy to take measures against vibrations of the light-weight control substrate 22, whereby it is possible to suppress increase in cost for measures against vibrations.

<Details of Component Arrangement in Power Conversion Device 100>

As seen in a direction perpendicular to a surface of the control substrate 22, at least some of the smoothing capacitors 17 and a target region 101 obtained by combining a region in which the first rectification element 15 is disposed, a region in which the second rectification element 16 is disposed, and a region between the first rectification element 15 and the second rectification element 16, overlap with each other. The target region 101 is a region enclosed by the broken line in each of FIG. 4 and FIG. 5. As shown in FIG. 4, four of the smoothing capacitors 17 that are disposed on the left side of FIG. 4 overlap with the target region 101 in the present embodiment.

As seen in the direction perpendicular to the surface of the control substrate 22, the second connection point 4 which is a low-potential-side connection point of each smoothing capacitor 17 connected to the busbar 36 which is the second main circuit wire 2, is disposed so as to overlap with the control substrate 22 and a region obtained by extending the target region 101 in the specific direction and a direction opposite to the specific direction. The region overlapping with the control substrate 22 and the region obtained by extending the target region 101 in the specific direction and the direction opposite to the specific direction, is an arrangement region 102 enclosed by the alternate long and short dash line in FIG. 5. As shown in FIG. 5, the second connection point 4 is located near the center of the arrangement region 102 in the present embodiment.

By this configuration, the smoothing capacitor 17 and the second connection point 4 are disposed in the immediate vicinity of the first rectification element 15 and the second rectification element 16. This disposition leads to reduction in the impedance of the path from the first connection point 3 to each of the first rectification element 15 and the second rectification element 16. Consequently, the level of noise generated in the path can be suppressed.

Further, as shown in FIG. 5, a configuration may be employed in which, as seen in the direction perpendicular to the surface of the control substrate 22, the first connection point 3 which is a high-potential-side connection point of the smoothing capacitor 17 connected to the busbar 35 which is the first main circuit wire, is disposed so as to overlap with the control substrate 22 and the region obtained by extending the target region 101 in the specific direction and the direction opposite to the specific direction. By this configuration, the smoothing capacitor 17 and the second connection point 4 are disposed in the immediate vicinity of the first rectification element 15 and the second rectification element 16, and the first connection point 3 is also disposed in the immediate vicinity of the first rectification element 15 and the second rectification element 16. These dispositions lead to further reduction in the impedance of the path from the first connection point 3 to each of the first rectification element 15 and the second rectification element 16. Therefore, the noise generated in the path can be further suppressed.

Further, a configuration may be employed in which, as seen in the direction perpendicular to the surface of the control substrate 22, the second connection point 4 which is the low-potential-side connection point of the smoothing capacitor 17 connected to the busbar 36, is disposed so as to overlap with the control substrate 22 and a region obtained by extending, in the specific direction and the direction opposite to the specific direction, a region that is located in the target region 101 and that is interposed between the second terminal 15*b* and the fourth terminal 16*b*. The region overlapping with the control substrate 22 and the region obtained by extending, in the specific direction and the direction opposite to the specific direction, the region that is located in the target region 101 and that is interposed between the second terminal 15*b* and the fourth terminal 16*b*, is an arrangement region 103 enclosed by the alternate long and two short dashes line in FIG. 5. As shown in FIG. 5, the second connection point 4 is located near the center of the arrangement region 103 in the present embodiment.

By this configuration, the effect of noise reduction can be further improved. Hereinafter, this effect will be described. The second connection point 4 is a load-side terminal for the first rectification element 15 and the second rectification element 16 and is disposed on an extension line 104 extended in the Y-axis direction from an intermediate point 104*a* between the second terminal 15*b* and the fourth terminal 16*b* which are anode terminals. By this disposition, the distance between the second connection point 4 and the anode terminal of the first rectification element 15 and the distance between the second connection point 4 and the anode terminal of the second rectification element 16 become equal to each other and form shortest paths. The magnitude of noise is dependent on a longer length out of the length between the second connection point 4 and the anode terminal of the first rectification element 15 and the length between the second connection point 4 and the anode terminal of the second rectification element 16. Therefore, the noise can be made smallest in the case of the above disposition.

Further, a configuration may be employed in which, as seen in the direction perpendicular to the surface of the control substrate 22, the secondary-side winding terminal 33*b* is disposed so as to be shifted, in the direction opposite to the specific direction, from the second connection point 4 which is the low-potential-side connection point of the smoothing capacitor 17 connected to the busbar 36. As shown in FIG. 5, the secondary-side winding terminal 33*b* and the second connection point 4 are disposed on the extension line 104. By this configuration, the size in the X-axis direction of the base 30 can be shortened, whereby the size of the power conversion device 100 can be reduced.

Further, a configuration may be employed in which the number of turns of the secondary winding 13*b* in the transformer 13 is smaller than the number of turns of the primary winding 13*a* therein. In the case of this configuration, current that flows on the secondary side inevitably becomes high, and thus the effect of reducing the level of noise exhibited by applying the configuration of the present disclosure is prominent. In particular, in a power conversion device 100 that steps down a voltage of an on-board high-voltage battery to convert the voltage into a voltage for an auxiliary device battery, the turn ratio of the transformer 13 is set to be high, and thus the effect exhibited by applying the configuration of the present disclosure becomes more prominent.

As described above, the power conversion device 100 according to the first embodiment includes: the base 30; the transformer 13 disposed on the component-arranged surface 30*a* of the base 30; the inverter portion 12; the control substrate 22 disposed apart from the component-arranged surface 30*a* of the base 30; the first rectification element 15 disposed on the component-arranged surface 30*a* side of the base 30 so as to be located on the specific direction side relative to the transformer 13; the second rectification element 16 disposed, side by side with the first rectification element 15, on the component-arranged surface 30*a* side of the base 30 so as to be located on the specific direction side relative to the transformer 13; the smoothing reactor 14 disposed on the component-arranged surface 30*a* of the base 30; the output filter circuit portion 18; the first main circuit wire 1 making connection between the smoothing reactor 14 and the output filter circuit portion 18; the second main circuit wire 2 making connection between the low-potential side of the external load and each of the second terminal 15*b* of the first rectification element 15 and the fourth terminal 16*b* of the second rectification element 16; and the smoothing capacitors 17 each having the high-potential-side terminal connected to the first main circuit wire 1 and each having the low-potential-side terminal connected to the second main circuit wire 2, the smoothing capacitors 17 being mounted on the control substrate 22, wherein, as seen in the direction perpendicular to the surface of the control substrate 22, at least some of the smoothing capacitors 17 and the target region 101 obtained by combining the region in which the first rectification element 15 is disposed, the region in which the second rectification element 16 is disposed, and the region between the first rectification element 15 and the second rectification element 16, overlap with each other, and, as seen in the direction perpendicular to the surface of the control substrate 22, the second connection point 4 which is the low-potential-side connection point of each smoothing capacitor 17 connected to the second main circuit wire 2, is disposed so as to overlap with the control substrate 22 and the region obtained by extending the target region 101 in the specific direction and the direction opposite to the specific direction. Thus, the smoothing capacitor 17 and the second connection point 4 are disposed in the immediate vicinity of the first rectification element 15 and the second rectification element 16. This disposition leads to reduction in the impedance of the path from the first connection point 3 to each of the first rectification element 15 and the second rectification element 16. Consequently, the level of noise generated in the path can be reduced.

Since the transformer 13 and the smoothing reactor 14 are disposed on the component-arranged surface 30*a* of the base 30, it is easy to take measures against vibrations of the transformer 13 and the smoothing reactor 14 which are heavy objects. Therefore, increase in cost for the power conversion device 100 regarding measures against vibrations can be suppressed. Further, the smoothing capacitor 17 is disposed on the control substrate 22 at a height different from the heights of wires through which high current flows, such as the busbar 35 and the busbar 36. Thus, it is unnecessary to use any high-cost thick-copper pattern substrate as the control substrate 22. Therefore, increase in cost for the power conversion device 100 regarding substrates can be suppressed.

If, as seen in the direction perpendicular to the surface of the control substrate 22, the first connection point 3 which is the high-potential-side connection point of the smoothing capacitor 17 connected to the busbar 35 which is the first main circuit wire, is disposed so as to overlap with the control substrate 22 and the region obtained by extending the target region 101 in the specific direction and the direction opposite to the specific direction, the smoothing capacitor 17 and the second connection point 4 are disposed in the immediate vicinity of the first rectification element 15 and the second rectification element 16, and the first connection point 3 is also disposed in the immediate vicinity of the first rectification element 15 and the second rectification element 16. These dispositions lead to further reduction in the impedance of the path from the first connection point 3 to each of the first rectification element 15 and the second rectification element 16. Therefore, the noise generated in the path can be further suppressed.

If, as seen in the direction perpendicular to the surface of the control substrate 22, the second connection point 4 which is the low-potential-side connection point of the smoothing capacitor 17 connected to the busbar 36, is disposed so as to overlap with the control substrate and the region obtained by extending, in the specific direction and the direction opposite to the specific direction, the region that is located in the target region 101 and that is interposed between the second terminal 15b and the fourth terminal 16b, the distance between the second connection point 4 and the load-side terminal of the first rectification element 15 and the distance between the second connection point 4 and the load-side terminal of the second rectification element 16 become equal to each other and form shortest paths. Thus, the effect of noise reduction can be further improved.

If the control substrate 22 is disposed at a location that is farther from the base 30 than the surfaces of the first rectification element 15 and the second rectification element 16 on the opposite side to the surfaces thereof on the base 30 side are, and that is closer to the base 30 than one or both of the surfaces of the transformer 13 and the smoothing reactor 14 on the opposite side to the surfaces thereof on the base 30 side are, the lengths in the Z-axis direction of the terminals 31 and 32 connected to the control substrate 22 can be shortened. Therefore, the length of the path from the first connection point 3 to each of the first rectification element 15 and the second rectification element 16 is shortened, whereby the effect of noise reduction can be more improved.

If one or two notches are provided in the outer periphery portion of the control substrate 22, and one or both of the transformer 13 and the smoothing reactor 14 are respectively disposed within the one or two notches, the control substrate 22 can be disposed around the base 30 in a focused manner, whereby the size of the power conversion device 100 can be reduced. Further, if the smoothing reactor 14 is disposed on the specific direction side relative to the transformer 13, and the first rectification element 15, the second rectification element 16, the busbar 35, the busbar 36, and the smoothing capacitor 17 are disposed between the smoothing reactor 14 and the transformer 13, the component-arranged surface 30a of the base 30 can be formed to be small, whereby the size of the power conversion device 100 can be reduced.

If a portion of the center tap that is connected to the smoothing reactor 14 is thermally connected to the base 30, heat generated from each of the transformer 13 and the smoothing reactor 14 can be efficiently dissipated via the base 30.

If the smoothing capacitor 17 is a capacitor for surface mounting, the mounting area and the mounting height of the smoothing capacitor 17 can be reduced, whereby the size of the power conversion device 100 can be reduced. Further, if the number of turns of the secondary winding is smaller than the number of turns of the primary winding, although current that flows on the secondary side inevitably becomes high, application of the configuration according to the present disclosure makes it possible to obtain a power conversion device 100 having a reduced level of noise. Further, if the base 30 is made of metal, the base 30 functions as a housing and functions also as a low-potential-side terminal. Thus, no other low-potential-side terminals are necessary, whereby productivity for the power conversion device 100 can be improved and increase in cost for the power conversion device 100 can be suppressed.

Second Embodiment

Figure 8:
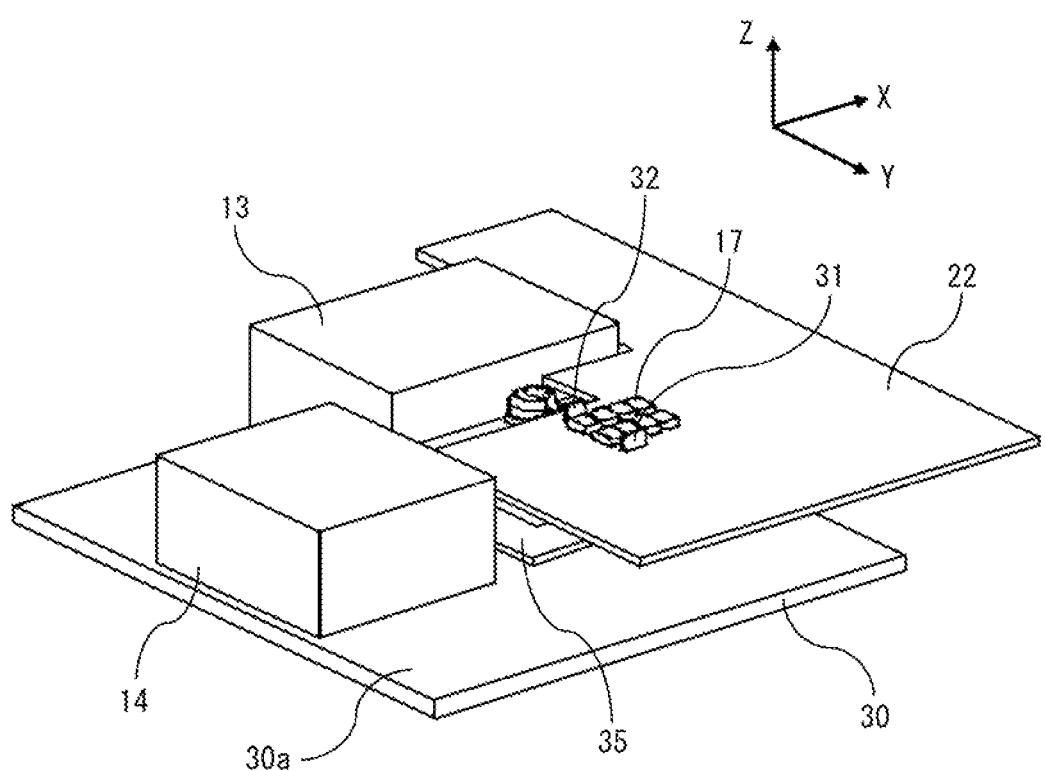
FIG. 8 is a perspective view showing a major part of a power conversion device according to a second embodiment.
Figure 9:
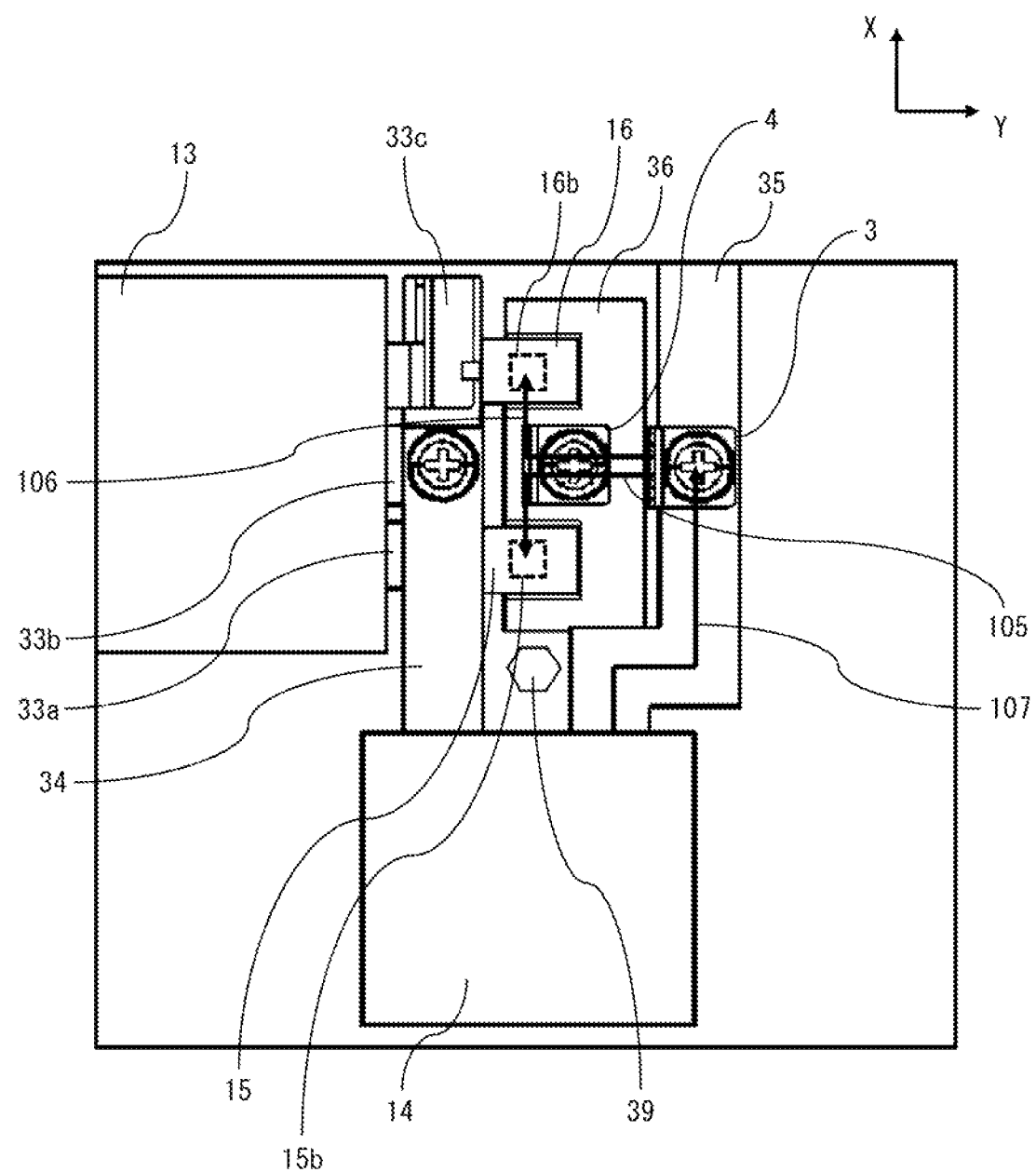
FIG. 9 is a plan view showing the major part of the power conversion device according to the second embodiment.

A power conversion device 100 according to a second embodiment will be described. FIG. 8 is a perspective view showing a major part of the power conversion device 100 according to the second embodiment, illustrating a configuration of the portion extending from the transformer 13 toward the output filter circuit portion 18 in FIG. 1. FIG. 9 is a plan view showing the major part of the power conversion device 100. FIG. 9 illustrates the configuration of the portion extending from the transformer 13 toward the output filter circuit portion 18 in FIG. 1, excluding the control substrate 22 and the smoothing capacitor 17. In the power conversion device 100 according to the second embodiment, the configuration of the busbar 35 is different from the configuration in the first embodiment.

As shown in FIG. 9, the smoothing reactor 14 is disposed on the secondary-side winding terminal 33a side in a direction perpendicular to the specific direction. Therefore, the busbar 35 is provided so as to be longer than the busbar 35 in the first embodiment. As seen in the direction perpendicular to the surface of the control substrate 22, each of a wire length 105 from the first connection point 3 which is the high-potential-side connection point of the smoothing capacitor 17 connected to the busbar 35 to the second terminal 15b of the first rectification element 15 and a wire length 106 from the first connection point 3 to the fourth terminal 16b of the second rectification element 16, is shorter than a wire length 107 of the busbar 35 from the smoothing reactor 14 to the first connection point 3. In FIG. 9, the second terminal 15b and the fourth terminal 16b provided on the busbar 36 side are indicated by the broken lines. The control substrate 22 is, at a surface thereof on the opposite side to the surface thereof on which the smoothing capacitor 17 is mounted, supported by a supporting column 39 and fixed to the base 30. In the present embodiment, the supporting column 39 has the shape of a hexagonal prism. However, the shape of the supporting column 39 is not limited thereto.

As described above, in the power conversion device 100 according to the second embodiment, as seen in the direction perpendicular to the surface of the control substrate 22, each of the wire length 105 from the first connection point 3 to the second terminal 15b and the wire length 106 from the first connection point 3 to the fourth terminal 16b is shorter than the wire length 107 of the busbar 35 from the smoothing reactor 14 to the first connection point 3. This leads to reduction in the impedance of the path from the first connection point 3 to each of the first rectification element 15 and the second rectification element 16. Consequently, the level of noise generated in the path can be reduced. Meanwhile, even though the length of the wire length 107 is lengthened, the level of noise does not deteriorate since this wire portion functions as an inductance connected in series to the smoothing reactor 14.

In this manner, no matter where the transformer 13 and the smoothing reactor 14 are disposed owing to restrictions on a layout inside the housing of the power conversion device 100, the configuration in which the wire length 107 from the output-side terminal of the smoothing reactor 14 to the first connection point 3 is lengthened such that the wire lengths 105 and 106 from the first connection point 3 to the load-side terminals of the first rectification element 15 and the second rectification element 16 are shorter than the wire length 107, makes it possible to reduce a parasitic inductance that could be a noise source and makes it possible to maintain the effect of noise reduction.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the technical scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 first main circuit wire
2 second main circuit wire
3 first connection point
4 second connection point
11 input capacitor
12 inverter portion
12a semiconductor switching element
13 transformer
13a primary winding
13b secondary winding
13c center tap
14 smoothing reactor
15 first rectification element
15a first terminal
15b second terminal
16 second rectification element
16a third terminal
16b fourth terminal
17 smoothing capacitor
18 output filter circuit portion
19 filter circuit reactor
20 filter circuit capacitor
21 control circuit
22 control substrate
23 output end
30 base
30a component-arranged surface
31, 32 terminal
33a, 33b, 33c secondary-side winding terminal
34, 35, 36 busbar
37, 38 insulation sheet
39 supporting column
40, 41, 44 screw
42, 43 nut
100 power conversion device
101 target region
102, 103 arrangement region
104 extension line
104a intermediate point
105, 106, 107 wire length

What is claimed is:

1. A power conversion device comprising:
a base;
a transformer disposed on a first surface of the base and having a primary winding and a secondary winding;
an inverter portion having a semiconductor switching element and configured to supply power to the primary winding;
a control substrate disposed apart from the first surface of the base and having a control circuit configured to control the inverter portion;
a first rectification element having a first terminal which is connected to one end portion of the secondary winding and which is provided adjacent to the transformer, the first rectification element further having a second terminal, the first rectification element being disposed on a first surface side of the base so as to be located on a specific direction side relative to the transformer;
a second rectification element having a third terminal which is connected to another end portion of the secondary winding and which is provided adjacent to the transformer, the second rectification element further having a fourth terminal, the second rectification element being disposed, side by side with the first rectification element, on the first surface side of the base so as to be located on the specific direction side relative to the transformer;
a smoothing reactor disposed on the first surface of the base and having one end portion connected to a center tap which is provided between the one end portion and the other end portion of the secondary winding;
an output filter circuit portion connected between another end portion of the smoothing reactor and a high-potential side of an external load;
a first main circuit wire making connection between the other end portion of the smoothing reactor and the output filter circuit portion;
a second main circuit wire making connection between a low-potential side of the external load and each of the second terminal of the first rectification element and the fourth terminal of the second rectification element; and
a plurality of smoothing capacitors, each having a high-potential-side terminal connected to the first main circuit wire, and each having a low-potential-side terminal connected to the second main circuit wire, said plurality of smoothing capacitors each being mounted on the control substrate, wherein
in a plan view of the control substrate, a subset of said plurality of smoothing capacitors and a target region obtained by combining a region in which the first rectification element is disposed, a region in which the second rectification element is disposed, and a region between the first rectification element and the second rectification element, overlap with each other, and
in said plan view, of the control substrate, a low-potential-side connection point of each of the plurality of smoothing capacitors, connected to the second main circuit wire, is disposed so as to overlap with the control substrate and a region obtained by extending the target region in the specific direction and a direction opposite to the specific direction.

2. The power conversion device according to claim 1, wherein, in said plan view of the control substrate, a high-potential-side connection point of each of the plurality of smoothing capacitors connected to the first main circuit wire, is disposed so as to overlap with the control substrate and the region obtained by extending the target region in the specific direction and the direction opposite to the specific direction.

3. The power conversion device according to claim 1, wherein, in said plan view of the control substrate, the low-potential-side connection point of each of the plurality of smoothing capacitors connected to the second main circuit wire, is disposed so as to overlap with the control substrate and a region obtained by extending, in the specific direction and the direction opposite to the specific direction, a region that is located in the target region and that is interposed between the second terminal and the fourth terminal.

4. The power conversion device according to claim 1, wherein, in said plan view of the control substrate, each of a wire length from a high-potential-side connection point of each of the plurality of smoothing capacitors connected to the first main circuit wire to the second terminal of the first rectification element and a wire length from the high-potential-side connection point of each of the plurality of smoothing capacitors to the fourth terminal of the second rectification element, is shorter than a wire length of the first main circuit wire from the smoothing reactor to the high-potential-side connection point of the plurality of smoothing capacitors.

5. The power conversion device according to claim 1, wherein the control substrate is located farther from the base than the first rectification element or the second rectification element, but closer to the base than top surfaces of the transformer and the smoothing reactor.

6. The power conversion device according to claim 5, wherein
one or two notches are provided in an outer periphery portion of the control substrate, and
one or both of the transformer and the smoothing reactor are respectively disposed within the one or two notches.

7. The power conversion device according to claim 1, wherein
the smoothing reactor is disposed on the specific direction side relative to the transformer, and
the first rectification element, the second rectification element, the first main circuit wire, the second main circuit wire, and the plurality of smoothing capacitors are disposed between the smoothing reactor and the transformer.

8. The power conversion device according to claim 1, wherein a portion of the center tap that is connected to the smoothing reactor is thermally connected to the base.

9. The power conversion device according to claim 1, wherein each of the plurality of smoothing capacitors is a capacitor for surface mounting.

10. The power conversion device according to claim 1, wherein the number of turns of the secondary winding is smaller than the number of turns of the primary winding.

11. The power conversion device according to claim 1, wherein the base is made of metal.

* * * * *